(12) United States Patent
Huang et al.

(10) Patent No.: US 12,519,852 B2
(45) Date of Patent: Jan. 6, 2026

(54) MARKING INFORMATION PROCESSING METHOD AND DEVICE, AND STORAGE MEDIUM

(71) Applicant: BEIJING BYTEDANCE NETWORK TECHNOLOGY CO., LTD., Beijing (CN)

(72) Inventors: Lin Huang, Beijing (CN); Bingxing Xie, Beijing (CN); Pengwen Jiao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 311 days.

(21) Appl. No.: 18/245,825

(22) PCT Filed: Aug. 27, 2021

(86) PCT No.: PCT/CN2021/115003
§ 371 (c)(1),
(2) Date: Mar. 17, 2023

(87) PCT Pub. No.: WO2022/057595
PCT Pub. Date: Mar. 24, 2022

(65) Prior Publication Data
US 2024/0031434 A1    Jan. 25, 2024

(30) Foreign Application Priority Data
Sep. 17, 2020   (CN) .......................... 202010981538.0

(51) Int. Cl.
*H04L 67/1095*   (2022.01)
*G06F 21/62*   (2013.01)
*H04L 9/40*   (2022.01)

(52) U.S. Cl.
CPC ...... *H04L 67/1095* (2013.01); *G06F 21/6218* (2013.01); *H04L 63/12* (2013.01)

(58) Field of Classification Search
CPC .. H04L 67/1095; H04L 63/12; G06F 21/6218
See application file for complete search history.

(56) References Cited

U.S. PATENT DOCUMENTS

| 8,806,320 B1 | 8/2014 | Abdo |
| 10,638,206 B1 * | 4/2020 | Cannon .............. H04N 21/8549 |

(Continued)

FOREIGN PATENT DOCUMENTS

| CN | 101453705 A | 6/2009 |
| CN | 103327037 A | 9/2013 |

(Continued)

OTHER PUBLICATIONS

Search Report issued Oct. 26, 2021 for PCT Application No. PCT/CN2021/115003, English translation, (4 pages).

(Continued)

*Primary Examiner* — Jason Chiang (57) ABSTRACT

Provided are a marking information processing method and device, and a storage medium. The method includes receiving a marking information synchronization request and a first list sent by a client device; detecting the validity of the marking information synchronization request; and in the case where the marking information synchronization request passes validity detection, synchronizing the marking information corresponding to the marking information synchronization request to a second list corresponding to a target account. The marking information is obtained by the client device in response to a marking operation on a display object when the account is not logged in.

20 Claims, 5 Drawing Sheets

(56) References Cited

U.S. PATENT DOCUMENTS

| | | | |
|---|---|---|---|
| 11,080,467 B1* | 8/2021 | Simpson | G06F 40/117 |
| 2007/0118794 A1* | 5/2007 | Hollander | G06F 16/954 |
| | | | 715/205 |
| 2007/0271498 A1* | 11/2007 | Schachter | G06F 16/9562 |
| | | | 715/764 |
| 2008/0120330 A1* | 5/2008 | Reed | G06F 16/48 |
| | | | 707/999.102 |
| 2008/0222166 A1* | 9/2008 | Hultgren | G06F 16/248 |
| 2009/0037211 A1* | 2/2009 | McGILL | G06Q 10/10 |
| | | | 705/319 |
| 2009/0193345 A1* | 7/2009 | Wensley | H04L 65/1094 |
| | | | 715/756 |
| 2010/0023863 A1* | 1/2010 | Cohen-Martin | G06Q 30/0601 |
| | | | 705/26.1 |
| 2011/0035264 A1* | 2/2011 | Zaloom | G06Q 30/0239 |
| | | | 707/723 |
| 2011/0238495 A1* | 9/2011 | Kang | G06Q 30/0251 |
| | | | 705/14.49 |
| 2011/0317981 A1* | 12/2011 | Fay | G06F 3/048 |
| | | | 386/280 |
| 2012/0072419 A1* | 3/2012 | Moganti | G06F 16/48 |
| | | | 707/737 |
| 2012/0101975 A1* | 4/2012 | Khosravy | G06Q 30/0201 |
| | | | 706/55 |
| 2012/0136905 A1* | 5/2012 | Pullara | G06F 16/904 |
| | | | 707/E17.005 |
| 2012/0143590 A1* | 6/2012 | Ajima | G06Q 30/0251 |
| | | | 704/E11.001 |
| 2012/0154854 A1* | 6/2012 | Sato | G06F 3/1287 |
| | | | 358/1.15 |
| 2012/0210224 A1* | 8/2012 | Wong | H04N 21/41407 |
| | | | 715/716 |
| 2012/0210225 A1* | 8/2012 | McCoy | G06F 3/0487 |
| | | | 715/719 |
| 2013/0004138 A1* | 1/2013 | Kilar | H04N 21/8455 |
| | | | 386/230 |
| 2013/0145269 A1* | 6/2013 | Latulipe | G06F 3/048 |
| | | | 715/720 |
| 2013/0326352 A1* | 12/2013 | Morton | G06F 3/0484 |
| | | | 715/719 |
| 2014/0023341 A1* | 1/2014 | Wang | H04N 9/87 |
| | | | 386/240 |
| 2014/0213180 A1* | 7/2014 | Cha | H04N 21/472 |
| | | | 455/39 |
| 2014/0281877 A1* | 9/2014 | Burge | G06F 40/169 |
| | | | 715/230 |
| 2014/0297727 A1* | 10/2014 | Li | H04L 51/234 |
| | | | 709/203 |
| 2015/0113000 A1* | 4/2015 | Scheer | G06F 16/447 |
| | | | 707/746 |
| 2015/0172246 A1* | 6/2015 | Velummylum | H04L 51/10 |
| | | | 709/206 |
| 2015/0237389 A1* | 8/2015 | Grouf | H04N 21/26283 |
| | | | 725/49 |
| 2015/0244794 A1* | 8/2015 | Poletto | G06F 16/285 |
| | | | 715/748 |
| 2015/0375117 A1* | 12/2015 | Thompson | A63F 13/79 |
| | | | 463/9 |
| 2017/0026672 A1* | 1/2017 | Dacus | H04N 21/23418 |
| 2017/0090704 A1* | 3/2017 | Hu | H04L 67/565 |
| 2017/0161246 A1* | 6/2017 | Klima | G06F 40/58 |
| 2017/0199855 A1* | 7/2017 | Fishbeck | G06Q 10/109 |
| 2018/0191660 A1* | 7/2018 | Tene | H04L 51/216 |
| 2019/0052925 A1* | 2/2019 | McDowell | G06Q 30/0233 |
| 2019/0260699 A1* | 8/2019 | Carriero | H04L 51/08 |
| 2020/0186576 A1* | 6/2020 | Gopal | H04L 65/1093 |
| 2020/0338449 A1* | 10/2020 | Fan | A63F 13/537 |
| 2020/0401281 A1* | 12/2020 | Shu | G06F 1/1694 |
| 2021/0084389 A1* | 3/2021 | Young | H04N 21/8547 |
| 2021/0240914 A1* | 8/2021 | Fryc | H04L 67/568 |
| 2021/0312227 A1* | 10/2021 | Moradiannejad | G06F 18/214 |
| 2021/0406450 A1* | 12/2021 | Kumar | G06N 20/00 |
| 2022/0027333 A1* | 1/2022 | Isaac | H04L 51/216 |
| 2022/0070129 A1* | 3/2022 | Boyd | H04L 67/306 |
| 2022/0159319 A1* | 5/2022 | Wang | H04N 21/23418 |

FOREIGN PATENT DOCUMENTS

| | | |
|---|---|---|
| CN | 103986738 A | 8/2014 |
| CN | 105138924 A | 12/2015 |
| CN | 106375861 A | 2/2017 |
| CN | 107528909 A | 12/2017 |
| CN | 109766508 A | 5/2019 |
| CN | 111371953 A | 7/2020 |
| CN | 114265998 B | 7/2025 |
| WO | 2018076446 A1 | 5/2018 |

OTHER PUBLICATIONS

Jiang et al., "Application of Single Sign-On on Traffic Management Information System", Intelligent Transportation, vol. 2, No. 19, 2010, pp. 1-4.

Office action received from Chinese patent application No. 202010981538.0 mailed on Dec. 5, 2024, 18 pages (10 pages English Translation and 8 pages Original Copy).

Wentao et al., "Using asynchronous sampling circuit to improve the design security of SRAM process FPGA", Integrated Circuit Applications, 2006, vol. 1, No. 5, pp. 1-5.

Written Opinion for International Application No. PCT/CN2021/115003, mailed Oct. 26, 2021, 7 Pages.

* cited by examiner

MARKING INFORMATION PROCESSING METHOD AND DEVICE, AND STORAGE MEDIUM

CROSS-REFERENCE TO RELATED APPLICATIONS

This is a National Stage Application, filed under 35 U.S.C. 371, of International Patent Application No. PCT/CN2021/115003, filed on Aug. 27, 2021, which claims priority to Chinese Patent Application No. 202010981538.0 filed with the China National Intellectual Property Administration (CNIPA) on Sep. 17, 2020, the disclosures of which are incorporated herein by reference in their entireties.

TECHNICAL FIELD

Embodiments of the present disclosure relate to the field of data processing technology, for example, a marking information processing method and device, and a storage medium.

BACKGROUND

With the development of mobile Internet technology, various content publishing platforms emerge, such as short video publishing platforms. A publisher may publish content on a content publishing platform through a browser or a client application. A browser may browse content published by others on a content publishing platform through a browser or a client application, and the browser may mark the browsed content as likes and favorites, or may mark a publisher of the browsed content as followers. The content and the publishers are display objects of the content publishing platform.

The current content publishing platforms usually do not support the preceding marking performed on a display object browsed by a browser when an account of the browser is not logged into a platform. The browser needs to go through a login or registration flow to perform a marking operation. Some content publishing platforms allow a browser to perform the preceding marking performed on a browsed display object when the account of the browser is not logged into the platform, however, the marking information is not stored. As a result, when the browser wants to browse the display object again, it becomes more difficult to search for the display object, and the user experience of the content browser is greatly reduced.

SUMMARY

The embodiments of the present disclosure provide a marking information processing method and device, and a storage medium to reduce the difficulty in searching for a display object marked when an account is not logged in.

The embodiments of the present disclosure provide a marking information processing method. The marking information processing method is applied to a server device and includes the steps below.

A marking information synchronization request and a first list sent by a client device are received. The marking information synchronization request is used to request to synchronize marking information in the first list to a second list corresponding to a target account. The marking information is obtained by the client device in response to a marking operation on a display object when the target account is not logged in.

The validity of the marking information synchronization request is detected.

In the case where the marking information synchronization request passes validity detection, the marking information in the preceding first list is synchronized to the second list corresponding to the target account so that the client device displays the display object corresponding to the marking information when the target account is logged in.

The embodiments of the present disclosure provide a server device. The device includes a request reception module, a validity detection module, and an information synchronization module.

The request reception module is configured to receive a marking information synchronization request and a first list sent by the client device. The marking information synchronization request is used to request to synchronize marking information in the first list to the second list corresponding to the target account. The marking information is obtained by the client device in response to the marking operation on the display object when the target account is not logged in.

The validity detection module is configured to detect the validity of the marking information synchronization request.

The information synchronization module is configured to, in the case where the marking information synchronization request passes validity detection, synchronize the marking information in the preceding first list to the second list corresponding to the target account so that the client device displays the display object corresponding to the marking information when the target account is logged in.

The embodiments of the present disclosure provide a marking information processing method.

The method is applied to a client device and includes the steps below.

Marking information is obtained in response to a marking operation on a display object when an account is not logged in.

In a case where a target account is used to log in or register, a marking information synchronization request and a first list containing the marking information are sent to a server device. The marking information synchronization request is used to request to synchronize the marking information in the first list to the second list corresponding to the target account so that the server device detects validity of the marking information synchronization request. In a case where the marking information synchronization request passes validity detection, the marking information in the first list is synchronized to the second list corresponding to the target account so that the client device displays the display object corresponding to the preceding marking information when the target account is logged in.

The embodiments of the present disclosure also provide a client device. The device includes a display object marking module and a request sending module.

The display object marking module is configured to obtain marking information in response to a marking operation on a display object when an account is not logged in.

The request sending module is configured to, in the case where the target account is used to log in or register, send a marking information synchronization request and a first list containing the preceding marking information to a server device. The marking information synchronization request is used to request to synchronize the marking information in the first list to the second list corresponding to the target account so that the server device detects the validity of the marking information synchronization request. The request sending module is further configured to, in a case where the marking information synchronization request passes validity detection, synchronize the marking information in the first list to the second list corresponding to the target account so that the client device displays the display object corresponding to the preceding marking information when the target account is logged in.

The embodiments of the present disclosure also provide an electronic device. The electronic device includes a processor and a memory.

The memory is configured to store a program for executing the method according to the preceding embodiments. The processor is configured to execute the program stored in the memory.

The embodiments of the present disclosure also provide a computer-readable storage medium. The medium stores a program for executing the method according to the preceding embodiments.

DETAILED DESCRIPTION

For a better understanding of the preceding technical schemes, technical schemes of embodiments of the present disclosure are described in detail below through embodiments in conjunction with drawings. It is to be understood that the embodiments of the present disclosure and the specific features in the embodiments are detailed descriptions of the technical schemes of the embodiments of the present disclosure, rather than limitations of the technical schemes of the present disclosure. If not conflicted, the embodiments of the present disclosure and the technical features in the embodiments may be combined with each other.

Figure 1:
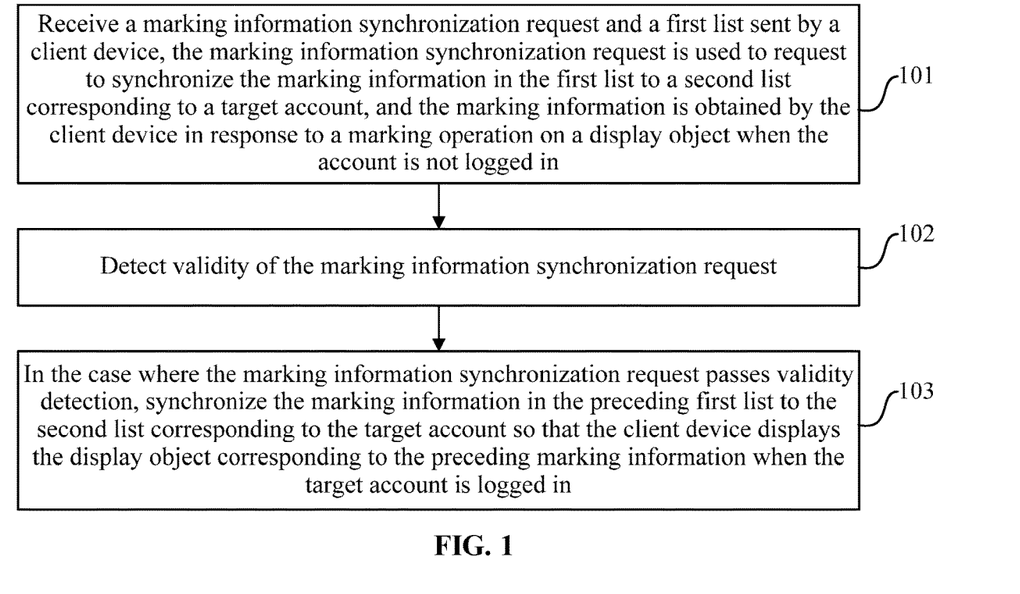
FIG. 1 is a flowchart of a marking information processing method according to an embodiment of the present disclosure.

The embodiments of the present disclosure provide a marking information processing method. This method is implemented by a server device. As shown in FIG. 1, the method includes the steps below.

In step 101, a marking information synchronization request and a first list sent by a client device are received. The marking information synchronization request is used to request to synchronize marking information in the first list to a second list corresponding to a target account. The marking information is obtained by a client device in response to a marking operation on a display object when the target account is not logged in.

The display object includes at least one of a publisher or content published by a publisher. The content published by the publisher may include at least one of text content, video content, picture content, or the like.

The marking operation on the content published by the publisher includes at least one of giving a like, commenting, adding to favorites, rating, forwarding, giving a negative comment, or the like. If the marking information is obtained by marking the content published by the publisher, the corresponding marking information may include at least one of the name of the content, a content storage address, the identifier (IDs) of the content, or the icon corresponding to the marking operation. If the marking operation is an operation that generates additional information such as forwarding and commenting, the marking information also includes the additional information generated by marking such as comment content and forwarding content.

The marking operation for the publisher includes at least one of following, unfollowing, recommending, giving a like, etc. If the marking information is obtained by performing the marking operation on the publisher, accordingly, the marking information may include at least one of the target account of the publisher, the mailbox of the publisher, the telephone number of the publisher, the identity identifier of the publisher, the nickname of the publisher, and so on.

The marking information synchronization request may request information synchronization only for the same kind of marking information (for example, the marking information synchronization request may request information synchronization only for the like information obtained in the case of giving a like to the content by the client device when an account is not logged in). The marking information synchronization request may also request information synchronization for different kinds of marking information (for example, the marking information synchronization request may request information synchronization for the like information obtained in the case of giving a like to the content by the client device when an account is not logged in and also for the comment information obtained in a case of commenting on the content by the client device when the account is not logged in). If the marking information synchronization request requests information synchronization for different kinds of marking information, each kind of marking information may correspond to one first list, or multiple kinds of marking information may be carried in the same first list.

The marking information synchronization request may carry the first list. The first list may also be sent to the server device through other messages. The marking information synchronization request may or may not carry the target account. In practical applications, the marking information synchronization request may be sent in the case where the client device uses an account to log in or register. Thus, the account used by the client device to log in or register is the target account.

In step 102, validity of the marking information synchronization request is detected.

Validity detection may identify false marking information and prevent the false marking information from being synchronized to the second list corresponding to the target account.

The embodiments of the present disclosure do not limit specific strategies and detection means for the validity detection. In practical applications, the strategies and the detection means for the validity detection in this step may be formulated according to factors such as the feature of the display object, the feature of the communication between the server device and the client device, and actual requirements. As an example rather than a limitation, a feature library of invalid synchronization requests may be established. A specified feature is extracted from the received marking information synchronization request, and the specified feature extracted is matched with features in the feature library. If the matching is successful, it is determined that the marking information synchronization request is an invalid synchronization request, and the validity detection is not passed. Otherwise, the validity detection is passed.

In practical applications, the server device may perform the validity detection by using a predetermined strategy on the server device itself or may send a validity detection request to a third-party device; the third-party device performs the validity detection; and the server device acquires the validity detection result (in this case, the implementation of step 102 is to request to detect the validity of the marking information synchronization request and acquire the validity detection result).

In step 103, in a case where the marking information synchronization request passes the validity detection, the marking information in the preceding first list is synchronized to the second list corresponding to the target account so that the client device displays the display object corresponding to the preceding marking information when the target account is logged in.

If the marking information synchronization request does not pass the validity detection, the marking information in the first list is not synchronized to the second list corresponding to the target account.

In practical applications, the marking information obtained by a browser performing different marking operations through the target account may be stored in different second lists corresponding to the target account. The second list may be stored in the server device or may be stored in a network device accessible to the server device. For example, the marking operation includes giving a like to the content and commenting on the content, and then the second list corresponding to the target account includes a like list corresponding to giving a like and a comment list corresponding to commenting. The like list stores like information, and the comment list stores comment information. The marking information obtained by different marking operations may also be stored in the same second list. For example, the marking operation includes giving a like to the content and commenting on the content, and then in the second list corresponding to the target account, like information is stored in association with a like operation, and comment information is stored in association with a comment operation.

After a browser logs into the target account, if it is necessary to browse the display object corresponding to the marking operation, in an embodiment, the client device sends a display object acquisition request to the server device to acquire the display object corresponding to a specified marking operation (for example, giving a like). After receiving the request, the server device searches for the display object according to the second list corresponding to the specified marking operation and sends the found display object to the client device. The client device displays the received display object.

In the marking information processing method provided by the embodiments of the present disclosure, the browser is allowed to send the marking information synchronization request through the client device. The marking information synchronization request is used to request to synchronize the marking information in the first list to the second list corresponding to the target account. The marking information is obtained by marking the display object by the client device when the account is not logged in, that is, the marking operation is performed on the display object when the account is not logged in. Moreover, the marking information obtained when the account is not logged in is allowed to be synchronized to the second list corresponding to the target account of the browser. For the implementation of information synchronization, reference is made to the description of the preceding method embodiments. In the method provided by the embodiments of the present disclosure, the marking information obtained by the client device in response to the marking operation of the browser when the account is not logged in may be stored. After the browser logs into the target account, the browser may quickly find the display object marked when the account is not logged in and the corresponding marking operation in the second list corresponding to the target account. In this manner, the difficulty in searching for the display object marked without logging in the account after the account is logged in is reduced, and the user experience is improved. In addition, a malicious operator may attempt to synchronize false marking information to the second list corresponding to the target account, since the malicious operator inevitably needs to send the preceding marking information synchronization request to the server device, in the method provided by the embodiments of the present disclosure, the validity of the marking information synchronization request is detected. In this manner, an invalid synchronization request can be effectively identified and prevented from requesting to synchronize the false marking information, thereby improving data security.

For example, the server device may also receive a marking information record request sent by the preceding client device when the account is not logged in. The marking information record request is used to indicate that the marking information is generated. The validity of the marking information record request is detected.

The marking information record request may carry the marking information.

Validity detection may identify and block the false marking information. The embodiments of the present disclosure do not limit specific strategies and detection means for the validity detection herein. In practical applications, the strategy and the detection means for the validity detection in this step may be formulated according to factors such as the feature of the display object, the feature of the communication between the server device and the client device, and actual requirements.

The detection process of the validity detection herein may be the same as or different from the detection process of the validity detection in the preceding step 102. The strategy of the validity detection herein may be the same as or different from the strategy of the validity detection in the preceding step 102. For the validity detection herein, the server device may perform validity detection by using the predetermined strategy on the device or may send the validity detection request to the third-party device. The third-party device performs the validity detection. The server device acquires the validity detection result.

After the validity detection is completed, on the one hand, a validity detection mark corresponding to the client device is configured according to the validity detection result of the marking information record request. The validity detection mark is at least used to represent the validity detection result of the current marking information record request. On the other hand, if the marking information record request carries the marking information, regardless of whether the validity detection mark corresponding to the client device is configured, the marking information corresponding to the current marking information record request may be stored in the case where the current marking information record request passes the validity detection.

There are multiple implementations for configuring the validity detection mark corresponding to the client device. In an implementation, the validity detection mark corresponding to the client device is a Boolean value. If a marking information record request does not pass the validity detection, the value of the validity detection mark is FALSE, which represents that at least one marking information record request sent by the client device does not pass the validity detection. If all previous marking information record requests pass the validity detection, the value of the validity detection mark is TRUE. In another implementation, there are multiple validity detection marks corresponding to the client device, and each validity detection mark corresponds to one marking information record request sent by the client device.

In the method provided by the embodiments of the present disclosure, the client device sends the marking information record request when the account is not logged in. The server device detects the validity of the request and stores the information (that is, the validity detection mark, also including the marking information) reflecting the validity detection result. The information may be used as prior information to provide a basis for determining whether information synchronization is allowed subsequently, and the information may also be used for other purposes.

In an embodiment, before receiving the marking information synchronization request sent by the client device, the server device receives a marking information pre-synchronization request sent by the client device. In response to the marking information pre-synchronization request, the server device searches for the validity detection marking corresponding to the client device and determines whether the client is allowed to send the marking information synchronization request according to the validity detection mark. In this embodiment, the validity detection mark corresponding to the client device may be used as prior information to determine whether the client is allowed to send the marking information synchronization request, thereby further improving the data security.

There are multiple implementations of how to perform the preceding determination by using the prior information, that is, the validity detection mark. In an implementation, if the validity detection mark corresponding to the client device represents that the validity detection results of all previous marking information record requests are passing the validity detection, the marking information synchronization request is allowed to be sent by the client device. Otherwise, the marking information synchronization request is not allowed to be sent by the client device. In another implementation, if the validity detection mark corresponding to the client device represents that the validity detection result of at least one marking information record request is passing the validity detection, the client is allowed to send the marking information synchronization request for the marking information corresponding to the at least one marking information record request. Otherwise, the client device is not allowed to send the marking information synchronization request. In practical applications, a specific determination strategy may be formulated according to the feature of the display object, actual scenario requirements, and so on.

In another embodiment, before receiving the marking information synchronization request sent by the client device, the server device may also receive the marking information pre-synchronization request sent by the client device. In response to the marking information pre-synchronization request, the server device searches for the marking information of the client device and determines whether the client device is allowed to send the marking information synchronization request according to the searching result. If the marking information of the client device is found, the client device is allowed to send the marking information synchronization request for the found marking information. Otherwise, the client device is not allowed to send the marking information synchronization request. In this embodiment, the marking information stored in the case where the preceding marking information record request passes the validity detection is used as the validity detection mark, and the marking information is used to determine whether the marking information synchronization request is allowed to be sent, thereby further improving the data security.

As described above, the preceding first list may be carried in a message other than the marking information synchronization request and sent to the server device. For example, the marking information pre-synchronization request may carry the first list.

In practical applications, the marking information pre-synchronization request may not carry the first list and does not carry any marking information, that is, the marking information pre-synchronization request does not request information synchronization for specific marking information.

On the basis of any of the preceding embodiments in which the marking information record request is received, before the validity of the marking information synchronization request is detected, the server device may also determine whether information synchronization is allowed to be performed on the marking information in the first list according to the validity detection result of the at least one marking information record request, so that the validity of the marking information synchronization request is allowed to be detected. The validity of the marking information synchronization request is detected based on the determination result in which the validity of the marking information synchronization request is allowed to be detected.

For the determination method and determination basis thereof, reference may be made to the description of the preceding embodiments, and the details are not repeated here.

In this embodiment, the prior information is determined by using the validity detection result of the marking information record request sent by the client device when the account is not logged in, and it is determined whether the validity of the preceding marking information synchronization request is allowed to be detected, thereby further improving the data security.

Based on any of the preceding method embodiments, the server device may store the marking information sent by the client device through the marking information record request in a third list local to the server device. The third list is located on the server device or the network device accessible to the server device (collectively referred to as being stored locally in the server device). The implementation in which the marking information in the first list is synchronized to the second list corresponding to the target account may include the following manners: The first list is updated according to the marking information in the third list, and the marking information in the updated first list is synchronized to the second list corresponding to the target account. For example, the marking information in the first list is compared with the marking information in the third list, and the marking information of the union set of the first list and the third list is synchronized to the second list corresponding to the target account.

If the client device sends the marking information record request, and the server device stores the marking information corresponding to the marking information record request that passes the validity detection, the marking information may be stored in the third list.

In this embodiment, the marking information in the first list is compared with the marking information stored locally in the server device. The marking information not stored locally is removed from the first list, thereby improving the reliability of information synchronization.

Figure 2:
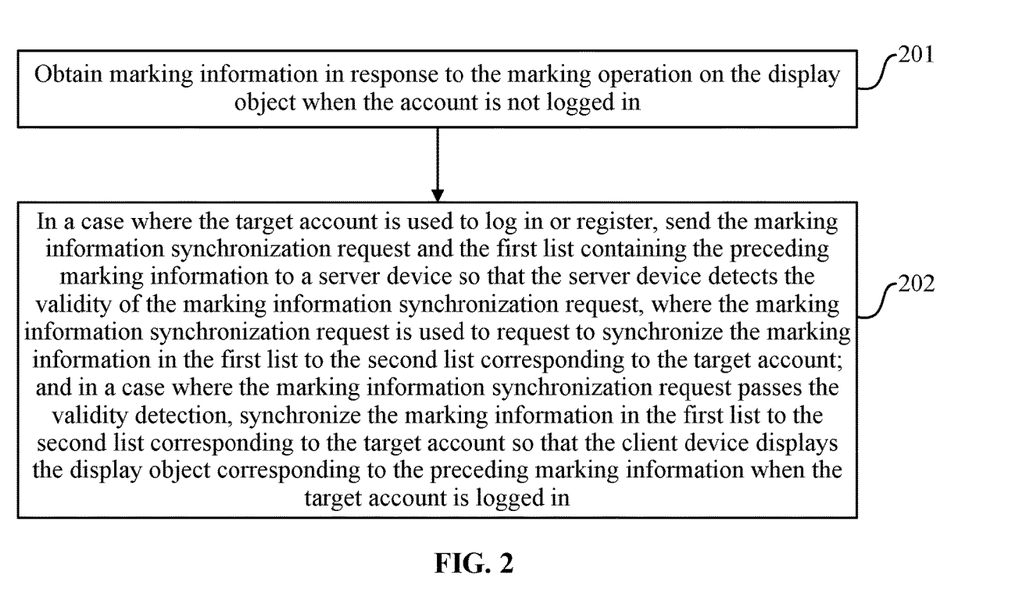
FIG. 2 is a flowchart of a marking information processing method according to another embodiment of the present disclosure.

The embodiments of the present disclosure provide a marking information processing method. This method is implemented by the client device. As shown in FIG. 2, the method includes the steps below.

In step 201, in response to the marking operation on the display object when the account is not logged in, the marking information is obtained.

In practical applications, the browser may mark the display object multiple times when the account is not logged in. Then, the client device performs step 201 to obtain the marking information each time.

In step 202, in the case where the target account is used to log in or register, the marking information synchronization request and the first list containing the preceding marking information are sent to the server device. The marking information synchronization request is used to request to synchronize the marking information in the first list to the second list corresponding to the target account so that the server device detects the validity of the marking information synchronization request. In the case where the marking information synchronization request passes validity detection, the marking information in the first list is synchronized to the second list corresponding to the target account so that the client device displays the display object corresponding to the marking information when the target account is logged in.

For the description of the marking information synchronization request and the processing of the marking information synchronization request by the server device, reference may be made to the description of the preceding method embodiments, and the details are not repeated here.

In the marking information processing method provided by the embodiments of the present disclosure, the browser is allowed to perform the marking operation on the display object through the client device when the account is not logged in. Moreover, the marking information obtained when the account is not logged in is allowed to be synchronized to the second list corresponding to the target account of the browser. For the implementation of information synchronization, reference is made to the description of the preceding method embodiments. According to the method provided by the embodiments of the present disclosure, the marking information obtained in response to the marking operation of the browser when the account is not logged in may be stored by the client device. After the browser logs into the target account, the browser may quickly find the display object marked when the account is not logged in and the corresponding marking operation in the second list corresponding to the target account. In this manner, the difficulty in searching for the display object marked when the account is not logged in and the corresponding marking operation after the account is logged in is reduced, and the user experience is improved. In addition, the malicious operator may attempt to synchronize the false marking information to the second list corresponding to the target account, since the malicious operator inevitably needs to send the preceding marking information synchronization request to the server device, in the method provided by the embodiments of the present disclosure, the validity of the marking information synchronization request is detected. In this manner, the invalid synchronization request can be effectively identified and prevented from requesting to synchronize the false marking information, thereby improving the data security.

For example, the client device may also send the marking information record request to the server device when the account is not logged in, so that the server device detects the validity of the marking information record request. The marking information record request is used to indicate that the marking information is generated.

In practical applications, the client device may send a marking information record request for marking information every time when the marking information is generated or may send the marking information record request according to another sending strategy (for example, sending at a predetermined time interval).

For the description of the marking information record request and the processing of the marking information record request by the server, reference may be made to the description of the preceding method embodiments, and the details are not repeated here.

In the method provided by the embodiments of the present disclosure, if the client device obtains the marking information in response to the marking operation on the display object when the account is not logged in, the client device may send the marking information record request to the server device. Accordingly, the server device may detect the validity of the marking information record request to identify a valid marking information record request (a marking information record request passing the validity detection) and an invalid marking information record request (a marking information record request failing to pass the validity detection).

For example, before the marking information synchronization request is sent to the server device, the client device may also send the marking information pre-synchronization request to the server device in the case where the target account is used to log in or register, so that after receiving the marking information pre-synchronization request, the server device searches for the validity detection mark corresponding to the client device. It is determined whether the client device is allowed to send the marking information synchronization request according to the validity detection mark.

For the description of the marking information pre-synchronization request and the processing of the marking information pre-synchronization request by the server device, reference may be made to the description of the preceding method embodiments, and the details are not repeated here.

In the following, an example in which the marking operation is giving a like to a video is used to describe the marking information processing method provided by the embodiments of the present disclosure in terms of the cooperative implementation of the server device and the client device.

Figure 3:
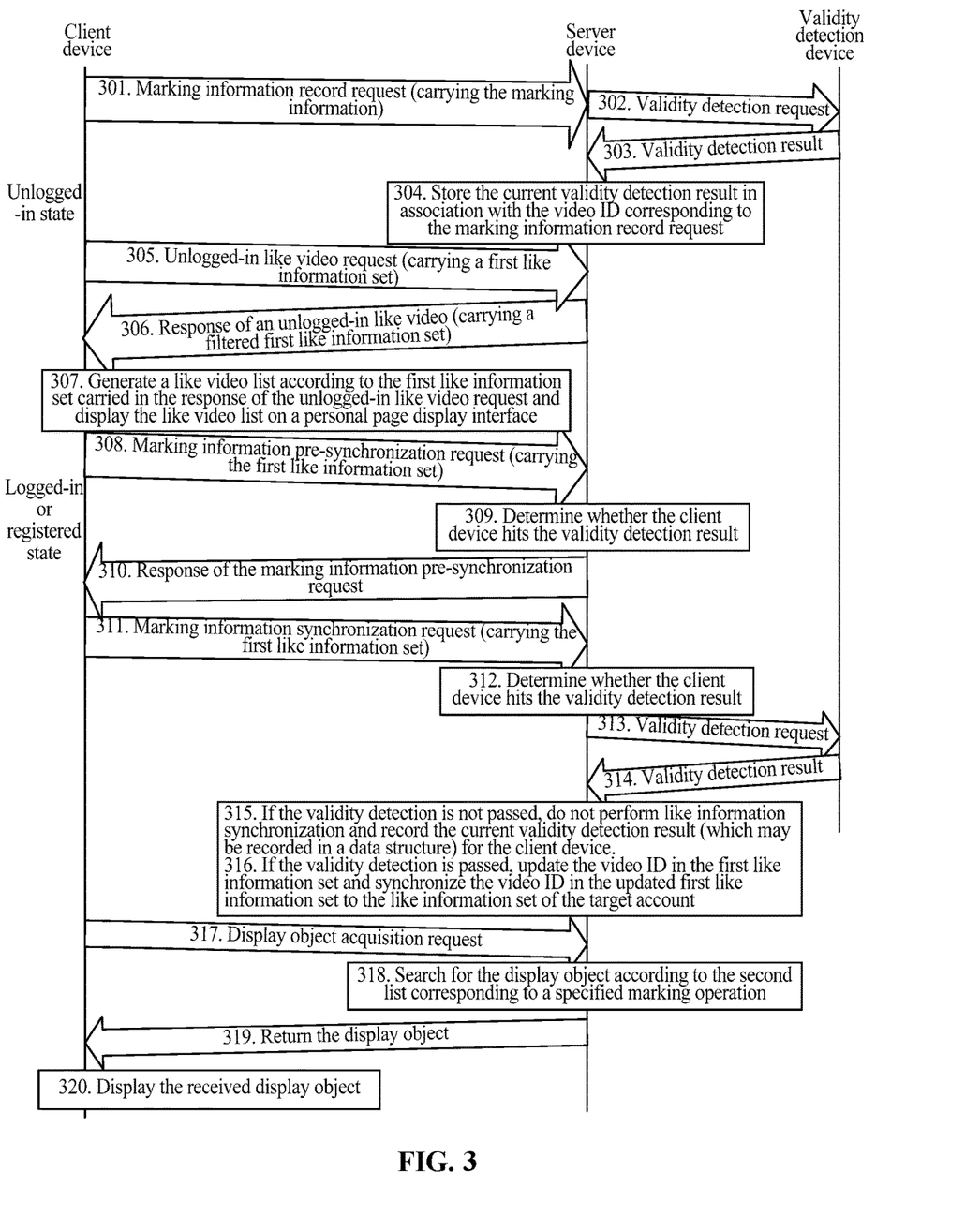
FIG. 3 is a flowchart of a marking information processing method according to another embodiment of the present disclosure.

The browser uses the client device to access the server device and browses a video published through the server device. The client device displays the video published through the server device on the display screen of the client device and displays a "like" button along with each video. The information table and processing method in response to the browser's like operation on the video are shown in FIG. 3, and the operations are as follows.

In step 301, when the account is not logged in, the client device sends a marking information record request to the server device. The marking information record request carries marking information.

For example, when the account is not logged in, and the browser browses video A, the "like" button is triggered, that is, a "like" marking operation is performed on video A. In response to the marking operation, the client device obtains the ID of video A and uses the ID of video A as the marking information, and then sends the marking information record request to the server device. The marking information record request carries the ID of video A.

In step 302, the server device receives the marking information record request and requests a validity detection device to detect the validity of the marking information record request received current time.

In step 303, the server device receives the validity detection result returned by the validity detection device.

The validity detection result represents whether the marking information record request passes the validity detection. As an example rather than a limitation, the validity detection result is a Boolean value. A value of TRUE represents that the marking information record request passes the validity detection. A value of FALSE represents that the marking information record request does not pass the validity detection.

In step 304, the server device stores the current validity detection result in association with the video ID corresponding to the marking information record request.

In practical applications, the server device and the validity detection device may be the same device or different devices. This is not limited in the present application.

In practical applications, the marking information and the validity detection result may be associatively stored in a first-in and first-out data structure. The validity detection result stored in association with identification data is used as the validity detection mark corresponding to the current marking information record request of the client device. Each marking information record request sent by the client device corresponds to one validity detection mark.

In practical applications, if a marking information record request of the client device does not pass the validity detection, the client device is not allowed to synchronize information. Only one validity detection mark may be configured for each client device. The value of the validity detection mark of 1 represents that all previous marking information record requests pass the validity detection. The value of the validity detection mark of 0 represents that at least one marking information record request fails to pass the validity detection.

In practical applications, the validity detection result may not be stored, but the marking information corresponding to the marking information record request that passes the validity detection is stored. The marking information is stored to represent that the marking information record request passes the validity detection.

If the browser gives a like to another video when the account is not logged in, the processing is performed with reference to the processing process of steps 301 to 304 described above.

Every time the browser gives a like when the account is not logged in, the client device not only sends a marking information record request to the server device, but also stores the ID of the current like video on the client device. The IDs of these videos constitute a first like information set (corresponding to the preceding first list).

The client device also displays a "personal page" button on the display screen of the client device itself. If the browser clicks the "personal page" button when the account is not logged in, the client invokes a personal page display interface and displays on the personal page display interface a like video list of the browser in a specified time interval when the account is not logged in. To display the like video list, step 305 is executed. The specified time interval when the account is not logged in may be configured according to actual conditions. For example, the time interval is a time period when the account is not logged in of the current day, or the time interval is all time periods when the account is not logged in after the client device logs out the last time.

In step 305, the client device sends a like video request when the account is not logged into the server device. The request carries the first like information set.

In step 306, the server device performs invalid video filtering on the first like information set. The filtered first like information set is carried in a response of the like video request when the account is not logged in and the filtered first like information set is returned to the client device.

In practical applications, the invalid video is defined according to actual conditions, such as a video deleted by the server, a video configured by a user as not authorized to access when the user does not log in, a video configured by the user as only visible to a publisher, and so on.

In step 307, the client device generates a like video list according to the first like information set carried in the response of the unlogged-in like video request and displays the like video list on the personal page display interface.

In addition, the client device may update the first like information set stored in the client device itself by using the first like information set carried in the response.

The client device also displays a "login" button and a "register" button on its display screen. If the browser uses the target account to log in by clicking the "login" button or registers the target account by clicking the "register" button, step 308 is executed after login authentication is successful or registration is successful.

In step 308, the client device sends the marking information pre-synchronization request to the server device. The marking information pre-synchronization request carries the first like information set.

In step 309, the server device determines whether the client device hits the validity detection result, that is, the server device determines whether the client device has a record of failing to pass the validity detection according to the validity detection result stored in the preceding first-in and first-out data structure.

In step 310, if no historical record of failing to pass the validity detection is recorded in the preceding data structure, the server device returns a response allowing synchronization back to the client device; otherwise, the server device returns a response that does not allow synchronization back to the client device.

In step 311, the client device sends the marking information synchronization request to the server device. The marking information synchronization request carries the first like information set.

For example, if information synchronization is allowed, the client device determines whether the target account uses the current client device to log in for the first time. If not, the browser is asked whether the browser needs to synchronize unlogged-in like data through a human-computer interaction interface. In the case where the browser agrees, as shown in FIG. 3, the marking information synchronization request is sent to the server device. The marking information synchronization request carries the first like information set. If the target account uses the current client device to log in for the first time, the client device directly sends the marking information synchronization request to the server device without asking the browser.

In step 312, the server device determines whether the client device hits the validity detection result, that is, the server device determines whether the client device has a record of failing to pass the validity detection according to the validity detection result stored in the preceding first-in and first-out data structure.

In step 313, if no historical record of failing to pass the validity detection is recorded, the server device requests the validity detection device to detect the validity of the marking information synchronization request.

If a historical record of failing to pass the validity detection is recorded in the preceding data structure, like information synchronization is not performed.

In step 314, the server device receives the validity detection result returned by the validity detection device.

In step 315, if the validity detection is not passed, the like information synchronization is not performed. The current validity detection result (which may be recorded in the preceding data structure) is recorded for the client device.

In step 316, if the validity detection is passed, the server device updates the video IDs in the first like information set and synchronizes the video IDs in the updated first like information set to the like information set of the target account.

For example, the server device compares the video IDs in the first like information set with the video IDs stored in the preceding first-in and first-out data structure, deletes a video ID not in the data structure from the first like information set, and synchronizes the remaining video IDs in the first like information set to the like information set (corresponding to the second list) of the target account.

In step 317, the client device sends a display object acquisition request to the server device to acquire the display object corresponding to a specified marking operation.

For example, after the browser logs into the target account, the browser clicks to enter the personal homepage. The client device sends the display object acquisition request to the server device to acquire a like video in response to the click behavior of the browser.

In step 318, in response to the display object acquisition request, the server device searches for the display object according to the second list corresponding to the specified marking operation.

For example, the server device searches for videos corresponding to the video IDs according to these video IDs in the like information set of the target account.

In step 319, the server device sends the found display object to the client device.

In step 320, the client device displays the received display object.

For example, the client device switches the display page of the client device to the personal homepage and displays the received display object on the personal homepage.

Figure 4:
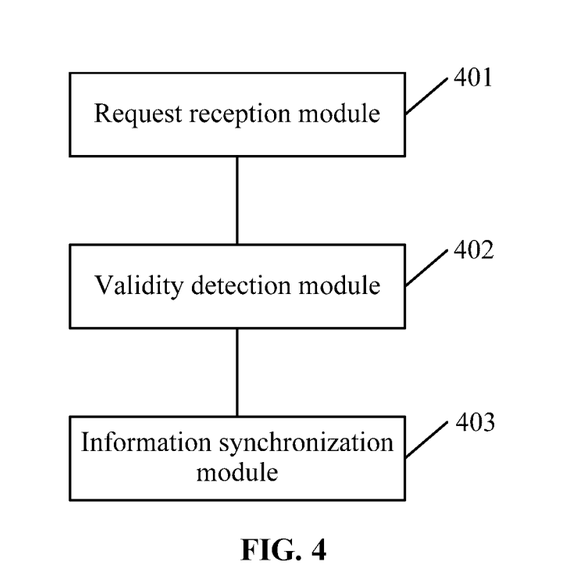
FIG. 4 is a block diagram of a server device according to an embodiment of the present disclosure.

The embodiments of the present disclosure provide a server device. As shown in FIG. 4, the device includes a request reception module 401, a validity detection module 402, and an information synchronization module 403.

The request reception module 401 is configured to receive a marking information synchronization request and a first list sent by a client device. The marking information synchronization request is used to request to synchronize marking information in the first list to a second list corresponding to a target account. The marking information is obtained by the client device in response to a marking operation on a display object when the account is not logged in.

The validity detection module 402 is configured to detect validity of the marking information synchronization request.

The information synchronization module 403 is configured to, in a case where the marking information synchronization request passes validity detection, synchronize the marking information in the preceding first list to the second list corresponding to the target account so that the client device displays the display object corresponding to the marking information when the target account is logged in.

In the server device provided by the embodiments of the present disclosure, the browser is allowed to perform the marking operation on the display object through the client device when the account is not logged in. Moreover, the marking information obtained when the account is not logged in is allowed to be synchronized to the second list corresponding to the target account of the browser. For the implementation of information synchronization, reference is made to the description of the preceding method embodiments. In the server device provided by the embodiments of the present disclosure, the marking information obtained by the client device in response to the marking operation of the browser when the account is not logged in may be stored. After the browser logs into the target account, the browser may quickly find the display object marked when the account is not logged in and the corresponding marking operation in the second list corresponding to the target account. In this manner, the difficulty in searching for the display object marked when the account is not logged in after the account is logged in is reduced, and the user experience is improved. In addition, the malicious operator may attempt to synchronize the false marking information to the second list corresponding to the target account, since the malicious operator inevitably needs to send the preceding marking information synchronization request to the server device, in the server device provided by the embodiments of the present disclosure, the validity of the marking information synchronization request is detected. In this manner, the invalid synchronization request can be effectively identified and prevented from requesting to synchronize the false marking information, thereby improving the data security.

For example, the request reception module may also receive a marking information record request sent by the preceding client device when the account is not logged in. The marking information record request is used to indicate that the marking information is generated. The validity detection module may also detect the validity of the marking information record request. Accordingly, the server device may also include a validity detection mark configuration module. The validity detection mark configuration module is configured to configure a validity detection mark corresponding to the client device according to the validity detection result of the marking information record request.

If the client device marks the display object when the account is not logged in, the client device may send the marking information record request to the server device. Accordingly, the server device may detect the validity of the marking information record request to identify the valid marking information record request (the marking information record request passing validity detection) and the invalid marking information record request (the marking information record request failing to pass the validity detection). Then the validity detection mark corresponding to the client device is configured according to the validity detection result of the current request. The validity detection mark is at least used to represent the validity detection result of the current request. In practical applications, the validity detection mark may be flexibly used as required to satisfy use requirements.

An implementation in which the preceding validity detection mark is used includes the following: Before the marking information synchronization request sent by the client device is received, the request reception module receives the marking information pre-synchronization request sent by the client device; and in response to the marking information pre-synchronization request, the validity detection module searches for the validity detection mark corresponding to the client device, and it is determined whether the client device is allowed to send the marking information synchronization request according to the validity detection mark.

In this embodiment, the validity detection mark corresponding to the client device may be used as the prior information to determine whether the marking information synchronization request is allowed to be sent, thereby further improving the data security.

There are multiple implementations of how to perform the preceding determination by using the prior information, that is, the validity detection mark. In an embodiment, if the validity detection mark corresponding to the client device represents that the validity detection results of all previous marking information record requests are that all previous marking information record requests pass validity detection, the client device is allowed to send the marking information synchronization request. Otherwise, the client device is not allowed to send the marking information synchronization request. In another embodiment, if the validity detection mark corresponding to the client device represents the validity detection result of at least one marking information record request passing the validity detection, the client is allowed to send the marking information synchronization request for the marking information corresponding to the at least one marking information record request. Otherwise, the client device is not allowed to send the marking information synchronization request.

For example, the request reception module may also receive the marking information record request sent by the client device when the account is not logged in. The marking information record request is used to indicate that the marking information is generated. The validity detection module is also configured to detect the validity of the marking information record request. Accordingly, the server device may also include a marking information storage module. The marking information storage module is configured to, in the case where the current marking information record request passes validity detection, store the marking information corresponding to the current marking information record request.

In the server device provided by the embodiments of the present disclosure, in the case where the current marking information record request passes the validity detection, the marking information corresponding to the request is stored. On the one hand, in the case where the browser's account is not logged in, the display object marked by the browser may be browsed. On the other hand, the stored marking information may be used as the validity detection mark.

For example, before the request reception module receives the marking information synchronization request sent by the client device, the request reception module may also receive the marking information pre-synchronization request sent by the client device. In response to the marking information pre-synchronization request, the validity detection module may also search for the marking information of the client device and determine whether the client device is allowed to send the marking information synchronization request according to the searching result. If the marking information of the client device is found, the client device is allowed to send the marking information synchronization request for the found marking information. Otherwise, the client device is not allowed to send the marking information synchronization request.

In this embodiment, the marking information stored in the case where the marking information record request passes validity detection is used as the validity detection mark and specifically used as the prior information used to determine whether the marking information synchronization request is allowed to be sent, thereby further improving the data security.

For example, before the validity of the marking information synchronization request is detected, the validity detection module may also determine whether the validity of the preceding marking information synchronization request is allowed to be detected according to the validity detection result of at least one marking information record request. The validity of the marking information synchronization request is detected based on the determination result in which the validity of the marking information synchronization request is allowed to be detected.

In this embodiment, the validity detection result of the marking information record request sent by the client device when the account is not logged in is used as the prior information to determine whether information synchronization of the marking information is allowed, thereby further improving the data security.

For example, the implementation in which the marking information in the first list is synchronized to the second list corresponding to the target account may include the following: The first list is updated by using the locally stored marking information, where the locally stored marking information includes the marking information corresponding to the marking information record request; and the marking information in the updated first list is synchronized to the second list corresponding to the target account.

In this embodiment, the first list is updated by the marking information locally stored in the server device, thereby improving the reliability of information synchronization.

Figure 5:
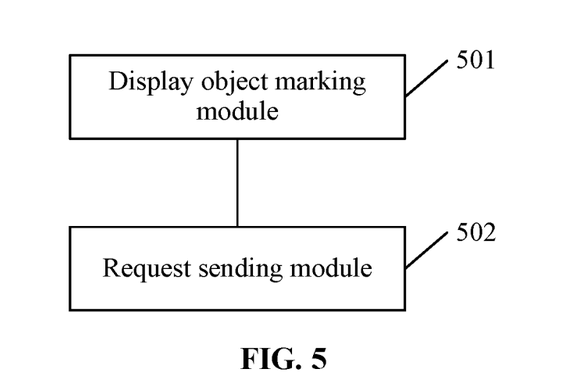
FIG. 5 is a block diagram of a client device according to an embodiment of the present disclosure.

The embodiments of the present disclosure also provide a client device. As shown in FIG. 5, the device includes a display object marking module 501 and a request sending module 502.

The display object marking module 501 is configured to obtain marking information in response to the marking operation on the display object when the account is not logged in.

The request sending module 502 is configured to, in the case where the target account is used to log in or register, the marking information synchronization request and the first list containing the preceding marking information are sent to the server device. The marking information synchronization request is used to request to synchronize the marking information in the first list to the second list corresponding to the target account so that the server device detects the validity of the marking information synchronization request. In the case where the marking information synchronization request passes validity detection, the marking information in the first list is synchronized to the second list corresponding to the target account so that the client device displays the display object corresponding to the preceding marking information when the target account is logged in.

In the client device provided by the embodiments of the present disclosure, the browser is allowed to perform a marking operation on the display object when the account is not logged in. Moreover, the marking information obtained when the account is not logged in is allowed to be synchronized to the second list corresponding to the target account of the browser. For the implementation of information synchronization, reference is made to the description of the preceding method embodiments. In the client device provided by the embodiments of the present disclosure, the marking information obtained by the client device in response to the marking operation of the browser when the account is not logged in may be stored. After the browser logs into the target account, the browser may quickly find the display object marked when the account is not logged in and the corresponding marking operation in the second list corresponding to the target account. In this manner, the difficulty in searching for the display object marked when the account is not logged in after the account is logged in is reduced, and the user experience is improved. In addition, the malicious operator may attempt to synchronize the false marking information to the second list corresponding to the target account, since the malicious operator inevitably needs to send the preceding marking information synchronization request to the server device. In the client device provided by the embodiments of the present disclosure, the validity of the marking information synchronization request is detected. In this manner, the invalid synchronization request can be effectively identified and prevented from requesting to synchronize the false marking information, thereby improving the data security.

For example, the request sending module may also send the marking information record request to the server device when the account is not logged in, so that the server device detects the validity of the marking information record request. The marking information record request is used to indicate that the marking information is generated.

In the client device provided by the embodiments of the present disclosure, if the display object is marked when the account is not logged in, the marking information record request is sent to the server device. Accordingly, the server device may detect the validity of the marking information record request to identify the valid marking information record request (the marking information record request passing validity detection) and the invalid marking information record request (the marking information record request failing to pass the validity detection).

For example, before the marking information synchronization request is sent to the server device, the request sending module may also send the marking information pre-synchronization request to the server device in the case where the target account is used to log in or register, so that after receiving the marking information pre-synchronization request, the request sending module searches for the validity detection mark corresponding to the client device. It is determined whether the client device is allowed to send the marking information synchronization request according to the validity detection mark.

Figure 6:
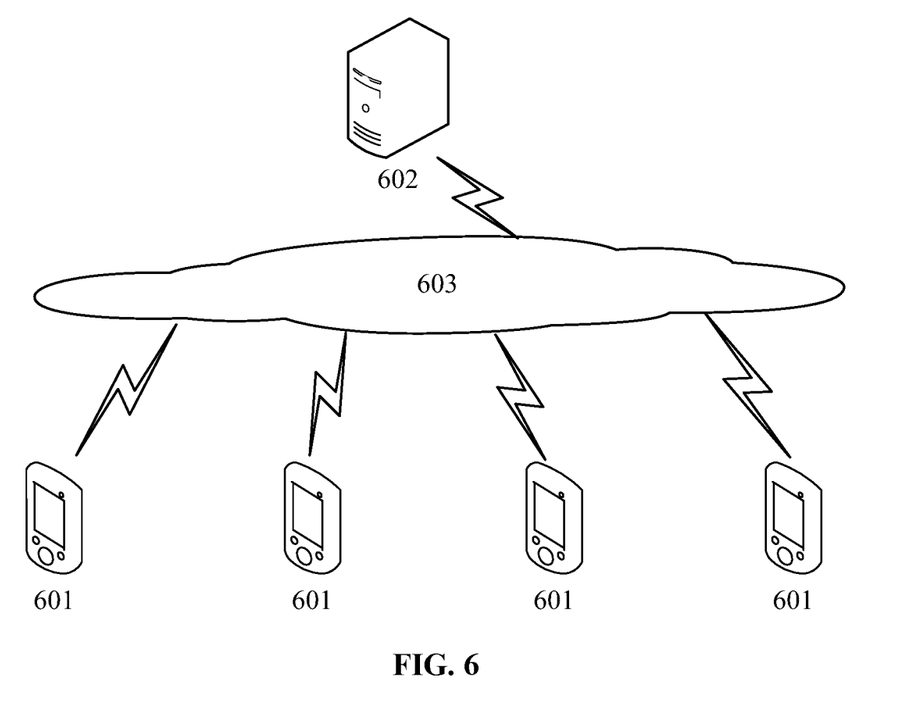
FIG. 6 is a block diagram of a marking information processing system according to an embodiment of the present disclosure.

The present disclosure also provides a marking information processing system. As shown in FIG. 6, the system includes a client device 601 and a server device 602.

Each client device 601 obtains the marking information in response to the marking operation on the display object when the account is not logged in. In the case where the target account is used to log in or register, the marking information synchronization request and the first list containing the preceding marking information are sent to the server device. The marking information synchronization request is used to request to synchronize the marking information in the first list to the second list corresponding to the target account.

The server device 602 receives the marking information synchronization request and the first list sent by the client device 601. The validity of the marking information synchronization request is detected. In the case where the marking information synchronization request passes validity detection, the marking information in the preceding first list is synchronized to the second list corresponding to the target account so that the client device 601 displays the display object corresponding to the marking information when the target account is logged in.

The client device 601 and the server device 602 are connected to the Internet 603 and communicate through the Internet 603.

For various functions and corresponding implementations of the client device 601, reference may be made to the description of the client device embodiment, and the details are not repeated here.

For various functions and corresponding implementations of the server device 602, reference may be made to the description of the server device embodiment, and the details are not repeated here.

The preceding modules may be implemented as software components executing on one or more general-purpose processors or may be implemented as hardware performing certain functions or combinations thereof, such as programmable logic devices and/or application-specific integrated circuits. In some embodiments, these modules may be in the form of a software product. The software product may be stored in non-volatile storage mediums. These non-volatile storage media include a computer device (such as a personal computer, a server, a network device, or a mobile terminal) that implements the method described in the embodiments of the present application. In an embodiment, the preceding modules may also be implemented on a single device or may be distributed on multiple devices. The functions of these modules may be combined with each other or may be further split into multiple sub-modules.

The server device in the preceding embodiments may include a single server or may include a server group (for example, a server cluster).

The client device in the preceding embodiments may include a mobile terminal such as a smartphone, a palmtop computer, a tablet computer, and a wearable device with a display screen and may also include a computer device such as a desktop computer, a notebook computer, and an all-in-one computer.

It is apparent to those skilled in the art that to describe conveniently and briefly, for specific working processes of the modules of the server device and the client device, reference may be made to corresponding processes in the preceding method embodiments, and the details are not repeated here.

The embodiments of the present disclosure also provide an electronic device. The electronic device includes a processor and a memory.

The memory is configured to store a program for executing the method according to the preceding method embodiments. The processor is configured to execute the program stored in the memory.

The processor may be a processing unit including a central processing unit (CPU) or another form of processing unit having data processing capabilities and/or instruction execution capabilities and can control other components in the electronic device to execute a desired function. The memory may include one or more computer program products. The one or more computer program products may include various forms of computer-readable storage media, such as a volatile memory and/or a non-volatile memory. The volatile memory may include, for example, a random-access memory (RAM) and/or a cache memory (cache). The non-volatile memory may include, for example, a read-only memory (ROM), a hard disk, and a flash memory. The computer-readable storage medium may store one or more computer program instructions. When executing the program instructions, the processor implements the functions of the preceding embodiments of the present disclosure and/or other desired functions.

Figure 7:
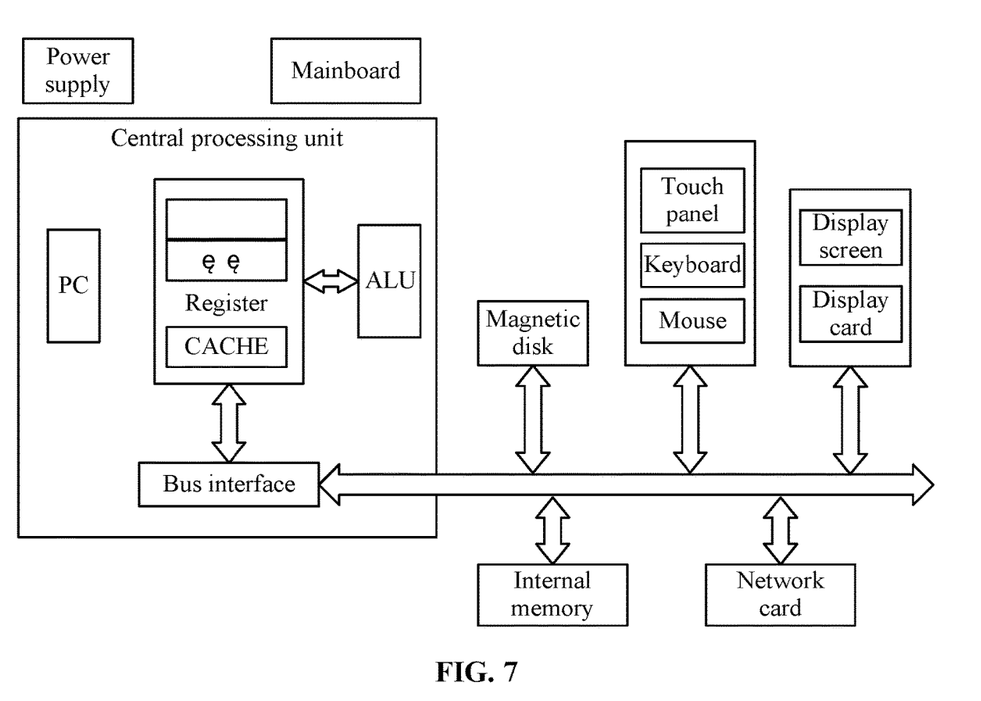
FIG. 7 is a diagram illustrating the structure of a server according to an embodiment of the present disclosure.

If the memory stores the program for executing the method shown in FIG. 1, the electronic device provided by the embodiments of the present disclosure may include a server. As shown in FIG. 7, the server includes at least a power supply, a mainboard, a central processing unit, an internal memory, a magnetic disk (that is, the preceding memory storing the program for executing the method according to the method embodiments), an input unit (including a mouse, a keyboard, and a touch panel), a display unit (including a display screen and a display card), and a network card. The power supply is logically connected to the central processing unit through a power supply management system, so that functions such as charging, discharging, and power consumption management are managed by the power supply management system. The mainboard provides an electrical connection path between components. Each component performs electrical signal transmission through the mainboard. Each component is mounted on the mainboard by plugging and welding. The central processing unit mainly includes an arithmetic logic unit (ALU), a program counter (PC), a register set, a cache memory (cache), and a bus interface for data, control, and status transmission. The network card performs data exchange with the central processing unit through a bus.

The program executing the method described in FIG. 1 and the related data are first read from the magnetic disk into the internal memory. The central processing unit reads and loads the program from the internal memory.

It should be understood by those skilled in the art that the structure of the computer device structure illustrated in FIG. 7 does not limit the computer device, and the computer device may include more or fewer components than those illustrated or may be configured by combining certain components or using different components.

Figure 8:
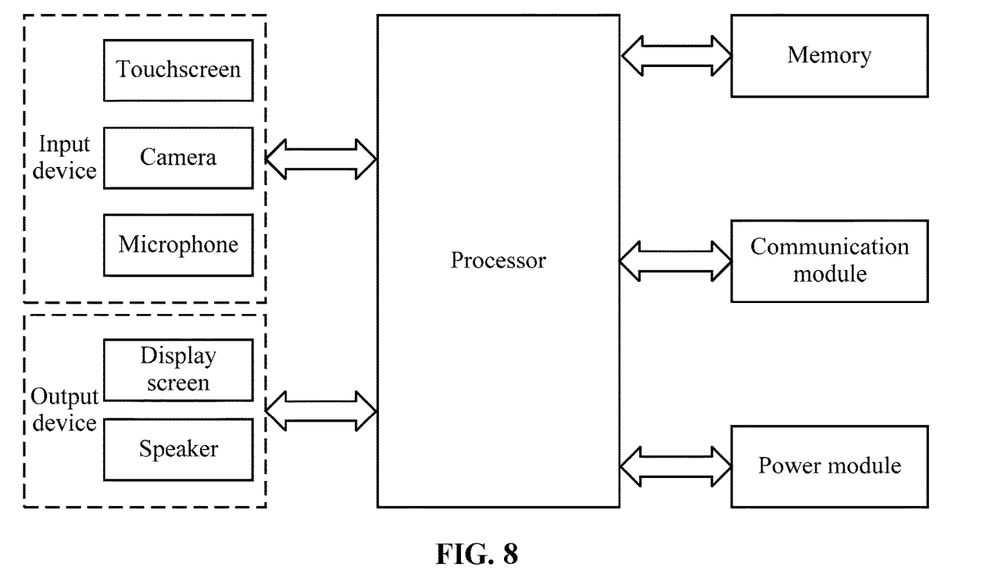
FIG. 8 is a diagram illustrating the structure of a mobile terminal according to another embodiment of the present disclosure.

If the memory stores the program for executing the method shown in FIG. 2, the electronic device provided in the embodiments of the present disclosure may include a mobile terminal. As shown in FIG. 8, the client device includes not only a processor and a memory, but also an input device (such as a touchscreen, a camera, and a microphone), an output device (such as a display screen and a speaker), a communication module, and a power module.

The memory, the input device, the output device, the communication module, and the power supply module are connected to the processor through a serial port, a bus, or a USB interface. For a single-processor mobile terminal, the processor is the central processing unit (CPU). For a dual-processor mobile terminal, the processor includes a main processor and a slave processor. The main processor executes an application program to implement the method provided in the embodiments of the present application. If it is necessary to communicate with the outside world, the slave processor controls the communication module to implement the method. For the mobile terminal including a graphics processor (GPU) and a CPU, where the processor refers to the GPU and the CPU, the method provided by the embodiments of the present disclosure is implemented by the GPU in cooperation with the CPU or by the CPU alone.

The memory of the mobile terminal may include, but is not limited to, a flash memory, a random-access memory (RAM), and a read-only memory (ROM). The RAM is mainly configured to store programs and data when the mobile terminal is running. The programs to be executed or the data to be processed must be loaded into the RAM first. The ROM is mainly configured to check the configuration of the operating system of the mobile terminal and provide the most basic input/output (I/O) program. The flash memory is a long-life non-volatile memory (capable of maintaining stored data information in case of a power outage). Data deletion is not in units of a single byte, but in units of a fixed block. Since the flash memory can still store data in case of the power outage, the flash memory is usually used for storing configuration information, such as the configuration information of a user on the mobile phone.

It should be noted that different mobile terminals (single-processor smartphones, dual-processor smartphones, smart wearable devices, and tablet computers) may include more or fewer hardware structures than the mobile terminal shown in FIG. 8, but as long as the mobile terminals include memories and processors and can implement the functions of the preceding method embodiments, the mobile terminals are within the protection scope of the present disclosure.

The embodiments of the present disclosure also provide a computer-readable storage medium. The medium stores a program for executing the method described in the various embodiments corresponding to the preceding client device and/or the preceding server device.

The specification is described with reference to flowcharts and/or block diagrams of methods, devices (systems) and computer program products according to the embodiments of the specification. It should be understood that computer program instructions may implement each flow and/or block in the flowcharts and/or block diagrams and a combination of flows and/or blocks in the flowcharts and/or block diagrams. These computer program instructions may be provided for a processor of a general-purpose computer, a special-purpose computer, an embedded processor, or another programmable data processing device to produce a machine so that instructions, which are executed through the processor of the computer or another programmable data processing device, create a device for implementing the functions specified in one or more flows in the flowcharts and/or in one or more blocks in the block diagrams.

These computer program instructions may also be stored in a computer-readable memory which is able to direct a computer or another programmable data processing device to operate in a particular manner so that the instructions stored in the computer-readable memory produce an article of manufacture including an instruction device which implement the functions specified in one or more flows in the flowcharts and/or in one or more blocks in the block diagrams.

These computer program instructions may also be loaded onto a computer or another programmable data processing device so that a series of operation steps are performed on the computer or another programmable device to produce processing implemented by a computer. Therefore, instructions executed on a computer or another programmable device provide steps for implementing the functions specified in one or more flows in the flowcharts and/or in one or more blocks in the block diagrams.

In the electronic device provided by the embodiments of the present disclosure, the browser is allowed to perform the marking operation on the display object through the client device when the account is not logged in. Moreover, the marking information obtained when the account is not logged in is allowed to be synchronized to the second list corresponding to the target account of the browser. For the implementation of information synchronization, reference is made to the description of the preceding method embodiments. According to the electronic device provided in the embodiments of the present disclosure, the marking information obtained by the client device in response to the marking operation of the browser when the account is not logged in may be stored. After the browser logs into the target account, the browser may quickly find the display object marked when the account is not logged in and the corresponding marking operation in the second list corresponding to the target account. In this manner, the difficulty in searching for the display object marked when the account is not logged in and the corresponding marking operation after the account is logged in is reduced, and the user experience is improved. In addition, the malicious operator may attempt to synchronize the false marking information to the second list corresponding to the target account, since the malicious operator inevitably needs to send the preceding marking information synchronization request to the server device, in the electronic device provided by the embodiments of the present disclosure, the validity of the marking information synchronization request is detected. In this manner, the invalid synchronization request can be effectively identified and prevented from requesting to synchronize the false marking information, thereby improving the data security.

In the program stored in the computer-readable storage medium provided by the embodiments of the present disclosure, the browser is allowed to perform the marking operation on the display object through the client device when the account is not logged in. Moreover, the marking information obtained when the account is not logged in is allowed to be synchronized to the second list corresponding to the target account of the browser. For the implementation of information synchronization, reference is made to the description of the preceding method embodiments. According to the preceding program, the marking information obtained by the client device in response to the marking operation of the browser when the account is not logged in may be stored. After the browser logs into the target account, the browser can quickly find the display object marked when the account is not logged in and the corresponding marking operation in the second list corresponding to the target account. In this manner, the difficulty in searching for the display object marked when the account is not logged in and the corresponding marking operation after the account is logged in is reduced, and the user experience is improved. In addition, the malicious operator may attempt to synchronize the false marking information to the second list corresponding to the target account, since the malicious operator inevitably needs to send the preceding marking information synchronization request to the server device, in the preceding program stored in the storage medium provided by the embodiments of the present disclosure, the validity of the marking information synchronization request is detected. In this manner, the invalid synchronization request can be effectively identified and prevented from requesting to synchronize the false marking information, thereby improving the data security.

What is claimed is:

1. A marking information processing method, the method being applied to a server device and comprising:
   receiving a marking information synchronization request and a first list sent by a client device, wherein the marking information synchronization request is used to request to synchronize marking information in the first list to a second list corresponding to a target account, and the marking information is obtained by the client device in response to a marking operation on a display object when the target account is not logged in;
   detecting validity of the marking information synchronization request; and
   in a case where the marking information synchronization request passes validity detection, synchronizing the marking information in the first list to the second list corresponding to the target account so that the client device displays the display object corresponding to the marking information when the target account is logged in.

2. The method according to claim 1, further comprising:
   receiving a marking information record request sent by the client device when the target account is not logged in, wherein the marking information record request is used to indicate that the marking information is generated;
   detecting validity of the marking information record request; and
   configuring a validity detection mark corresponding to the client device according to a validity detection result of the marking information record request.

3. The method according to claim 2, before receiving the marking information synchronization request sent by the client device, further comprising:
   receiving a marking information pre-synchronization request sent by the client device; and
   in response to the marking information pre-synchronization request, searching for the validity detection mark corresponding to the client device, and determining, according to the validity detection mark, whether the client device is allowed to send the marking information synchronization request.

4. The method according to claim 3, wherein determining, according to the validity detection mark, whether the client device is allowed to send the marking information synchronization request comprises at least one of the following:
   in a case where the validity detection mark corresponding to the client device represents that all validity detection results of all previous marking information record requests are passing validity detection, allowing the client device to send the marking information synchronization request, or in a case where the validity detection mark corresponding to the client device represents that not all validity detection results of all previous marking information record requests are passing validity detection, not allowing the client device to send the marking information synchronization request; or
   in a case where the validity detection mark corresponding to the client device represents that a validity detection result of at least one marking information record request is passing validity detection, allowing the client device to send the marking information synchronization request for marking information corresponding to the at least one marking information record request, or in a case where the validity detection mark corresponding to the client device represents that validity detection results of all marking information record requests are failing to pass validity detection, not allowing the client device to send the marking information synchronization request.

5. The method according to claim 2, before detecting the validity of the marking information synchronization request, further comprising:
determining, according to a validity detection result of at least one marking information record request, whether the validity of the marking information synchronization request is allowed to be detected and detecting, based on a determination result in which the validity of the marking information synchronization request is allowed to be detected, the validity of the marking information synchronization request.

6. The method according to claim 2, wherein synchronizing the marking information in the first list to the second list corresponding to the target account comprises:
updating the first list according to locally stored marking information, and synchronizing the marking information in the updated first list to the second list corresponding to the target account, wherein the locally stored marking information comprises marking information indicated by the marking information record request.

7. The method according to claim 1, further comprising:
receiving a marking information record request sent by the client device when the target account is not logged in, wherein the marking information record request is used to indicate that the marking information is generated;
detecting validity of the marking information record request; and
in a case where the marking information record request passes validity detection, storing the marking information corresponding to the marking information record request.

8. The method according to claim 7, before receiving the marking information synchronization request sent by the client device, further comprising:
receiving a marking information pre-synchronization request sent by the client device;
in response to the marking information pre-synchronization request, searching for the marking information corresponding to the client device and determining, according to a searching result, whether the client device is allowed to send the marking information synchronization request; and
in response to determining that the marking information corresponding to the client device is found, allowing the client device to send the marking information synchronization request for the found marking information; or in response to determining that the marking information corresponding to the client device is not found, not allowing the client device to send the marking information synchronization request.

9. A marking information processing method, the method being applied to a client device and comprising:
in response to a marking operation on a display object when a target account is not logged in, obtaining marking information;
in a case where the target account is used to log in or register, sending a marking information synchronization request and a first list containing the marking information to a server device so that the server device detects validity of the marking information synchronization request; wherein the marking information synchronization request is used to request to synchronize the marking information in the first list to a second list corresponding to the target account; and
in a case where the marking information synchronization request passes validity detection, synchronizing the marking information in the first list to the second list corresponding to the target account so that the client device displays the display object corresponding to the marking information when the target account is logged in.

10. The method according to claim 9, further comprising:
sending a marking information record request to the server device when the target account is not logged in so that the server device detects validity of the marking information record request, wherein the marking information record request is used to indicate that the marking information is generated.

11. The method according to claim 10, before sending the marking information synchronization request to the server device, further comprising:
in the case where the target account is used to log in or register, sending a marking information pre-synchronization request to the server device so that after receiving the marking information pre-synchronization request, the server device searches for a validity detection mark corresponding to the client device; and determining, according to the validity detection mark, whether the client device is allowed to send the marking information synchronization request.

12. An electronic device, comprising a processor and a memory, wherein
the memory is configured to store a program for executing the following:
receiving a marking information synchronization request and a first list sent by a client device, wherein the marking information synchronization request is used to request to synchronize marking information in the first list to a second list corresponding to a target account, and the marking information is obtained by the client device in response to a marking operation on a display object when the target account is not logged in;
detecting validity of the marking information synchronization request; and
in a case where the marking information synchronization request passes validity detection, synchronizing the marking information in the first list to the second list corresponding to the target account so that the client device displays the display object corresponding to the marking information when the target account is logged in; and
the processor is configured to execute the program stored in the memory.

13. The electronic device according to claim 12, wherein the program stored in the memory further executes:
receiving a marking information record request sent by the client device when the target account is not logged in, wherein the marking information record request is used to indicate that the marking information is generated;
detecting validity of the marking information record request; and
configuring a validity detection mark corresponding to the client device according to a validity detection result of the marking information record request.

14. The electronic device according to claim 13, wherein before receiving the marking information synchronization request sent by the client device, the program stored in the memory further executes:
- receiving a marking information pre-synchronization request sent by the client device; and
- in response to the marking information pre-synchronization request, searching for the validity detection mark corresponding to the client device, and determining, according to the validity detection mark, whether the client device is allowed to send the marking information synchronization request.

15. The electronic device according to claim 14, wherein the program stored in the memory executes determining, according to the validity detection mark, whether the client device is allowed to send the marking information synchronization request by at least one of the following:
- in a case where the validity detection mark corresponding to the client device represents that all validity detection results of all previous marking information record requests are passing validity detection, allowing the client device to send the marking information synchronization request, or in a case where the validity detection mark corresponding to the client device represents that not all validity detection results of all previous marking information record requests are passing validity detection, not allowing the client device to send the marking information synchronization request; or
- in a case where the validity detection mark corresponding to the client device represents that a validity detection result of at least one marking information record request is passing validity detection, allowing the client device to send the marking information synchronization request for marking information corresponding to the at least one marking information record request, or in a case where the validity detection mark corresponding to the client device represents that validity detection results of all marking information record requests are failing to pass validity detection, not allowing the client device to send the marking information synchronization request.

16. The electronic device according to claim 13, wherein before detecting the validity of the marking information synchronization request, the program stored in the memory further executes:
- determining, according to a validity detection result of at least one marking information record request, whether the validity of the marking information synchronization request is allowed to be detected and detecting, based on a determination result in which the validity of the marking information synchronization request is allowed to be detected, the validity of the marking information synchronization request.

17. The electronic device according to claim 13, wherein the program stored in the memory executes synchronizing the marking information in the first list to the second list corresponding to the target account by:
- updating the first list according to locally stored marking information, and synchronizing the marking information in the updated first list to the second list corresponding to the target account, wherein the locally stored marking information comprises marking information indicated by the marking information record request.

18. The electronic device according to claim 12, wherein the program stored in the memory further executes:
- receiving a marking information record request sent by the client device when the target account is not logged in, wherein the marking information record request is used to indicate that the marking information is generated;
- detecting validity of the marking information record request; and
- in a case where the marking information record request passes validity detection, storing the marking information corresponding to the marking information record request.

19. The electronic device according to claim 18, wherein before receiving the marking information synchronization request sent by the client device, the program stored in the memory further executes:
- receiving a marking information pre-synchronization request sent by the client device;
- in response to the marking information pre-synchronization request, searching for the marking information corresponding to the client device and determining, according to a searching result, whether the client device is allowed to send the marking information synchronization request; and
- in response to determining that the marking information corresponding to the client device is found, allowing the client device to send the marking information synchronization request for the found marking information; or in response to determining that the marking information corresponding to the client device is not found, not allowing the client device to send the marking information synchronization request.

20. A non-transitory computer-readable storage medium, storing one or more computer program instructions that, when executed by a processor, cause the processor to perform operations comprising:
- receiving a marking information synchronization request and a first list sent by a client device, wherein the marking information synchronization request is used to request to synchronize marking information in the first list to a second list corresponding to a target account, and the marking information is obtained by the client device in response to a marking operation on a display object when the target account is not logged in;
- detecting validity of the marking information synchronization request; and
- in a case where the marking information synchronization request passes validity detection, synchronizing the marking information in the first list to the second list corresponding to the target account so that the client device displays the display object corresponding to the marking information when the target account is logged in.

* * * * *